(12) United States Patent  
Allen

(10) Patent No.: US 10,805,087 B1
(45) Date of Patent: Oct. 13, 2020

(54) CODE SIGNING METHOD AND SYSTEM

(71) Applicant: Amazon Technologies, Inc., Seattle, WA (US)

(72) Inventor: Nicholas Alexander Allen, Kirkland, WA (US)

(73) Assignee: Amazon Technologies, Inc., Seattle, WA (US)

(*) Notice: Subject to any disclaimer, the term of this patent is extended or adjusted under 35 U.S.C. 154(b) by 180 days.

(21) Appl. No.: 16/147,393

(22) Filed: Sep. 28, 2018

(51) Int. Cl.
H04L 9/32 (2006.01)
G06F 21/64 (2013.01)
H04L 9/30 (2006.01)
G06F 8/65 (2018.01)

(52) U.S. Cl.
CPC .............. H04L 9/3247 (2013.01); G06F 8/65 (2013.01); G06F 21/64 (2013.01); H04L 9/30 (2013.01); H04L 9/3268 (2013.01)

(58) Field of Classification Search
CPC ................................ H04L 9/3247; H04L 9/30
See application file for complete search history.

(56) References Cited

U.S. PATENT DOCUMENTS

| 7,127,712 B1* | 10/2006 | Noble | G06F 8/65 |
| | | | 717/173 |
| 8,286,238 B2* | 10/2012 | Durham | G06F 8/656 |
| | | | 726/22 |
| 8,312,249 B1* | 11/2012 | Trumbull | G06F 9/44521 |
| | | | 711/203 |
| 9,176,752 B1* | 11/2015 | Marr | G06F 9/4411 |
| 2010/0223475 A1* | 9/2010 | MacFarlane | G06F 21/53 |
| | | | 713/189 |
| 2012/0213370 A1* | 8/2012 | Moskovics | G06F 21/57 |
| | | | 380/278 |
| 2013/0318357 A1* | 11/2013 | Abraham | G06F 21/565 |
| | | | 713/176 |
| 2015/0363576 A1* | 12/2015 | Medvinsky | H04L 9/3247 |
| | | | 726/26 |
| 2016/0127133 A1* | 5/2016 | Pinder | H04L 9/3265 |
| | | | 713/176 |
| 2016/0345088 A1* | 11/2016 | Vilermo | H04R 1/083 |
| 2017/0010875 A1* | 1/2017 | Martinez | G06F 21/575 |
| 2017/0222910 A1* | 8/2017 | Cai | H04L 67/34 |
| 2018/0285086 A1* | 10/2018 | O'Malley | H04L 67/303 |
| 2018/0330095 A1* | 11/2018 | Packer Ali | G06F 21/44 |

(Continued)

OTHER PUBLICATIONS

Cooper, D., et al., "Internet X.509 Public Key Infrastructure Certificate and Certificate Revocation List (CRL) Profile," Request for Comments: 5280, Standards Track, 141 pages.

(Continued)

Primary Examiner — Ali Shayanfar
(74) Attorney, Agent, or Firm — Davis Wright Tremaine LLP

(57) ABSTRACT

A computer system obtains a request to apply a signed patch to a piece of signed executable code. The computer system determines whether the signed patch is allowed to be applied to the signed executable based on a set of patch policies. If the patch policies allow the patch to be applied, the patch is applied to the signed executable code. The computer system generates a new digital signature for the modified executable code thereby allowing the resulting signed patched executable code to be verified and executed by the computer system.

17 Claims, 11 Drawing Sheets

(56) References Cited

U.S. PATENT DOCUMENTS

| | | | |
|---|---|---|---|
| 2019/0102255 A1* | 4/2019 | O'Malley | G06F 11/3438 |
| 2019/0268164 A1* | 8/2019 | Rossetti | H04L 67/1097 |
| 2019/0311117 A1* | 10/2019 | Sysman | G06F 11/07 |
| 2019/0341060 A1* | 11/2019 | Hines | G10L 19/008 |

OTHER PUBLICATIONS

Polk, W., et al., "Algorithms and Identifiers for the Internet X.509 Public Key Infrastructure Certificate and Certificate Revocation List (CRL) Profile," Request for Comments: 3279, Standards Track, Apr. 2002, 26 pages.

Schaad, J., et al., "Additional Algorithms and Identifiers for RSA Cryptography for Use in the Internet X.509 Public Key Infrastructure Certificate and Certificate Revocation List (CRL) Profile," Request for Comments: 4055, Standards Track, Jun. 2005, 24 pages.

Leontiev, S., and D. Shefanovski, "Using the GOST R 34.10-94, GOST R 34.10-2001, and GOST R 34.11-94 Algorithms With the Internet X.509 Public Key Infrastructure Certificate and CRL Profile," Request for Comments: 4491, Standards Track, 19 pages.

Lehtinen, S., and C. Lonvick, "The Secure Shell (SSH) Protocol Assigned Numbers," Request for Comments: 4250, Standards Track, Jan. 2006, 19 pages.

Ylonen, T., and C. Lonvick, "The Secure Shell (SSH) Protocol Architecture," Request for Comments: 4251, Standards Track, Jan. 2006, 28 pages.

Ylonen, T., and C. Lonvick, "The Secure Shell (SSH) Authentication Protocol," Request for Comments: 4252, Standards Track, Jan. 2006, 16 pages.

Ylonen, T., and C. Lonvick, "The Secure Shell (SSH) Transport Layer Protocol," Request for Comments: 4253, Standards Track, Jan. 2006, 30 pages.

Ylonen, T., and C. Lonvick, "The Secure Shell (SSH) Connection Protocol," Request for Comments: 4254, Standards Track, Jan. 2006, 23 pages.

Schlyter, J., and W. Griffin, "Using DNS to Securely Publish Secure Shell (SSH) Key Fingerprints," Request for comments: 4255, Standards Track, Jan. 2006, 9 pages.

Cusack, F., and M. Forssen, "Generic Message Exchange Authentication for the Secure Shell Protocol (SSH)," Request for Comments: 4256, Standards Track, Jan. 2006, 12 pages.

Galbraith, J., and P. Remaker, "The Secure Shell (SSH) Session Channel Break Extension," Request for comments: 4335, Standards Track, Jan. 2006, 6 pages.

Bellare, M., et al., "The Secure Shell (SSH) Transport Layer Encryption Modes," Request for Comments: 4344, Standards Track, Jan. 2006, 12 pages.

Harris, B., "Improved Arcfour Modes for the Secure Shell (SSH) Transport Layer Protocol," Request for Comments: 4345, Standards Track, Jan. 2006, 5 pages.

Friedl, M., et al., "Dithe-Hellman Group Exchange for the Secure Shell (SSH) Transport Layer Protocol," Request for comments: 4419, Standards Track, Mar. 2006, 10 pages.

Harris, B., "RSA Key Exchange for the Secure Shell (SSH) Transport Layer Protocol," Request for Comments: 4432, Standards Track, Mar. 2006, 8 pages.

Hutzelman, J., et al., "Generic Security Service Application Program Interface (GSS-API) Authentication and Key Exchange for the Secure Shell (SSH) Protocol," Request for Comments: 4462, Standards Track, May 2006, 28 pages.

Galbraith, J. and R. Thayer, "The Secure Shell (SSH) Public Key File Format," Request for Comments: 4716, Nov. 2006, 11 pages.

Galbraith, J., et al., "Secure Shell Public Key Subsystem," Request for Comments: 4819, Standards Track, Mar. 2007, 18 pages.

Igoe, K., and J. Solinas, "Aes Galois Counter Mode for the Secure Shell Transport Layer Protocol," Request for comments: 5647, Informational, Aug. 2009, 10 pages.

Stebiula, D., and J. Green, "Elliptic Curve Algorithm Integration in the Secure Shell Transport Layer," Request for comments: 5656, Standards Track, Dec. 2009, 19 pages.

Igoe, K., and D. Stebila, "X.509v3 Certificates for Secure Shell Authentication," Request for Comments: 6187, Standards Track, Mar. 2011, 17 pages.

Igoe, K., "Suite B Cryptographic Suites for Secure Shell (SSH)," Request for Comments: 6239, Informational, May 2011, 15 pages.

Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.

Bider, D., and M. Baushke, "SHA-2 Data Integrity Verification for the Secure Shell (SSH) Transport Layer Protocol," Request for Comments: 6668, Standards Track, Jul. 2012, 6 pages.

Dierks, T., et al., "The TLS Protocol Version 1.0," Request for Comments: 2246, Standards Track, Jan. 1999, 75 pages.

Newman, C., "Using TLS with IMAP, POP3 and ACAP," Request for Comments: 2595, Standards Track, Jun. 1999, 16 pages.

Medvinsky, A., et al., "Addition of Kerberos Cipher Suites to Transport Layer Security (TLS)," Request for comments: 2712, Standards Track, Oct. 1999, 7 pages.

Khare, R., et al., "Upgrading to TLS Within HTTP/1.1," Request for Comments: 2817, Standards Track, May 2000, 13 pages.

Rescorla, E., "HTTP Over TLS," Request for Comments: 2818, Informational, May 2000, 8 pages.

Hoffman, P., "SMTP Service Extension for Secure SMTP over Transport Layer Security," Request for Comments: 3207, Standards Track, Feb. 2002, 9 pages.

Chown, P., "Advanced Encryption Standard (AES) Ciphersuites for Transport Layer Security (TLS)," Request for comments: 3268, Standards Track, Jun. 2002, 8 pages.

Blake-Wilson, S., et al., "Transport Layer Security (TLS) Extensions," Request for Comments: 3546, Standards Track, Jun. 2003, 28 pages.

Hollenbeck, S., "Transport Layer Security Protocol Compression Methods," Request for Comments: 3749, Standards Track, May 2004, 8 pages.

Friend, R., "Transport Layer Security (TLS) Protocol Compression Using Lempel-Ziv-Stac (LZS)," Request for comments: 3943, Informational, Nov. 2004, 13 pages.

Moriai, S., et al., "Addition of Camellia Cipher Suites to Transport Layer Security (TLS)," Request for Comments: 4132, Standards Track, Jul. 2005, 8 pages.

Lee, H.J., et al., "Addition of Seed Cipher Suites to Transport Layer Security (TLS)," Request for Comments: 4162, Standards Track, Aug. 2005, 7 pages.

Ford-Hutchinson, P., "Securing FTP with TLS," Request for Comments: 4217, Standards Track, Oct. 2005, 29 pages.

Eronen, P., and H. Tschofenig, "Pre-Shared Key Ciphersuites for Transport Layer Security (TLS)," Request for comments: 4279, Standards Track, Dec. 2005, 16 pages.

Rescorla, E., and N. Modadugu, "Datagram Transport Layer Security," Request for Comments: 4347, Standards Track, Apr. 2006, 26 pages.

Blake-Wilson, S., et al., "Transport Layer Security (TLS) Extensions," Request for Comments: 4366, Standards Track, Apr. 2006, 29 pages.

Blake-Wilson, S., et al., "Elliptic Curve Cryptography (ECC) Cipher Suites for Transport Layer Security (TLS)," Request for Comments: 4492, Informational, May 2006, 36 pages.

Santesson, S., "TLS Handshake Message for Supplemental Data," Request for Comments: 4680, Standards Track, Sep. 2006, 10 pages.

Santesson, S., et al., "TLS User Mapping Extension," Request for Comments: 4681, Standards Track, Oct. 2006, 11 pages.

Blumenthal, U., and P. Goel, "Pre-Shared Key (PSK) Ciphersuites with Null Encryption for Transport Layer Security (TLS)," Request for Comments: 4785, Standards Track, Jan. 2007, 6 pages.

Taylor, D., et al., "Using the Secure Remote Password (SRP) Protocol for Tls Authentication," Request for Comments: 5054, Informational, Nov. 2007, 25 pages.

(56) References Cited

OTHER PUBLICATIONS

Salowey, J., et al., "Transport Layer Security (TLS) Session Resumption without Server-Side State," Request for Comments: 5077, Standards Track, Jan. 2008, 21 pages.

Mavrogiannopoulos, N., "Using OpenPGP Keys for Transport Layer Security (TLS) Authentication," Request for Comments: 5081, Experimental, Nov. 2007, 9 pages.

Phelan, T., "Datagram Transport Layer Security (DTLS) over the Datagram Congestion Control Protocol (DCCP)," Request for Comments: 5238, Standards Track, May 2008, 11 pages.

Dierks, T., and E. Rescorla, "The Transport Layer Security (TLS) Protocol Version 1.2," Request for Comments: 5246, Standards Track, Aug. 2008, 98 pages.

Salowey, J., et al., "AES Galois Counter Mode (GCM) Cipher Suites for Tls," Request for Comments: 5288, Standards Track, Aug. 2008, 9 pages.

Rescorla, E., "Tls Elliptic Curve Cipher Suites with SHA-256/384 and AES Galois Counter Mode (GCM)," Request for Comments: 5289, Informational, Aug. 2008, 7 pages.

Rescorla, E., et al., "Transport Layer Security (TLS) Renegotiation Indication Extension," Request for Comments: 5746, Standards Track, Feb. 2010, 16 pages.

McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.

Brown, M., and R. Housley, "Transport Layer Security (TLS) Authorization Extensions," Request for Comments: 5878, Experimental, May 2010, 19 pages.

Kato, A., et al., "Camellia Cipher Suites for TLS," Request for Comments: 5932, Standards Track, Jun. 2010, 7 pages.

Tuexen, M., et al., "Datagram Transport Layer Security (DTLS) for Stream Control Transmission Protocol (SCTP)," Request for Comments: 6083, Standards Track, Jan. 2011, 10 pages.

Eastlake, D., "Transport Layer Security (TLS) Extensions: Extension Definitions," Request for Comments: 6066, Standards Track, Jan. 2011, 25 pages.

Mavrogiannopoulos, N., and D. Gillmor, "Using OpenPGP Keys for Transport Layer Security (TLS) Authentication," Request for Comments: 6091, Informational, Feb. 2011, 9 pages.

Turner, S., and T. Polk, "Prohibiting Secure Sockets Layer (SSL) Version 2.0," Request for Comments: 6176, Standards Track, Mar. 2011, 4 pages.

Kim, W., et al., "Addition of the ARIA Cipher Suites to Transport Layer Security (TLS)," Request for Comments: 6209, Informational, Apr. 2011, 10 pages.

Rescorla, E., and N. Modadugu, "Datagram Transport Layer Security Version 1.2," Request for Comments: 5347, Standards Track, Jan. 2012, 33 pages.

Kanno, S., and M. Kanda, "Addition of the Camellia Cipher Suites to Transport Layer Security (TLS)," Request for comments: 6367, Informational, Sep. 2011, 9 pages.

Salter, M., and R. Housley, "Suite B Profile for Transport Layer Security (TLS)," Request for Comments: 6460, Informational, Jan. 2012, 15 pages.

Mcgrew, D., and D. Bailey, "AES-CCM Cipher Suites for Transport Layer Security (TLS)," Request for Comments: 5655, Standards Track, Jul. 2012, 8 pages.

Merkle, J., and M. Lochter, "Elliptic Curve Cryptography (ECC) Brainpool Curves for Transport Layer Security (TLS)," Request for Comments: 7027, Informational, Oct. 2013, 11 pages.

Gutmann, P., "Encrypt-then-MAC for Transport Layer Security (TLS) and Datagram Transport Layer Security (DTLS)," Request for Comments: 7366, Standards Track, Sep. 2014, 7 pages.

Atkinson, R., "Security Architecture for the Internet Protocol," Request for Comments: 1825, Standards Track, Aug. 1995, 23 pages.

Atkinson, R., "IP Authentication Header," Request for Comments: 1826, Standards Track, Aug. 1995, 14 pages.

Atkinson, R., "IP Encapsulating Security Payload (ESP)," Request for Comments: 1827, Standards Track, Aug. 1995, 13 pages.

Metzger, P., et al., "IP Authentication Using Keyed MD5," Request for Comments: 1828, Standards Track, Aug. 1995, 6 pages.

Karn, P., et al., "The ESP DES-CBC Transform," Request for Comments: 1829, Standards Track, Aug. 1995, 11 pages.

Orman, H., "The Oakley Key Determination Protocol," Request for Comments: 2412, Informational, Nov. 1998, 56 pages.

Kent, S., and R. Atkinson, "Security Architecture for the Internet Protocol," Request for Comments: 2401, Standards Track, Nov. 1998, 62 pages.

Kent, S., and K. Seo, "Security Architecture for the Internet Protocol," Request for Comments: 4301, Standards Track, Dec. 2005, 102 pages.

Housley, R., "Using Advanced Encryption Standard (AES) CCM Mode With IPsec Encapsulating Security Payload (ESP)," Request for Comments: 4309, Standards Track, Dec. 2005, 14 pages.

Kent, S., "IP Encapsulating Security Payload (ESP)," Request for Comments: 4303, Standards Track, Dec. 2005, 45 pages.

Dang, Q., "Recommendation for Applications Using Approved Flash Algorithms," NIST Special Publication 800-107, Revision 1, U.S. Department of Commerce, Aug. 2012, 25 pages.

"What is Code Signing?," SSLShopper, <www.sslshoppercom/what-is-code-signing.html> May 29, 2019, 7 pages.

"Code signing," Wikipedia, May 23, 2019, <https://en.wikipedia.org/wiki/Code_signing> [retrieved May 29, 2019], 6 pages.

* cited by examiner

CODE SIGNING METHOD AND SYSTEM

BACKGROUND

Code signing is often used to improve the security of a computer system. In some examples, an author of a computer program is issued a digital certificate that is associated with a public key and a private key. When distributing a computer program, the author applies a digital signature to the set of executable instructions associated with a computer program, and provides a copy of the digital certificate. When the program is run on a client computer system that enforces code signing, the computer system verifies the digital signature on the set of executable instructions using the public key included in the author's digital certificate. If the computer system is configured to trust programs produced by the author, the set of executable instructions is executed on the computer system. If the computer system is not configured to trust programs produced by the author, or if the digital signature on the set of executable instructions is invalid, the computer system is prevented from running the set of executable instructions.

For a variety of reasons, it may be desirable to modify a piece of signed executable code after it is installed on the system. For example, code may be modified to patch bugs, configure logging operations, or customize operation. If the modifications are performed by a party other than the author of the code, it is unlikely that the modifying party has access to the cryptographic key necessary to restore the digital signature to the modified code. This may prevent the computer system from verifying the modified code prior to execution.

BRIEF DESCRIPTION OF THE DRAWINGS

Various techniques will be described with reference to the drawings, in which.

DETAILED DESCRIPTION

Figure 1:
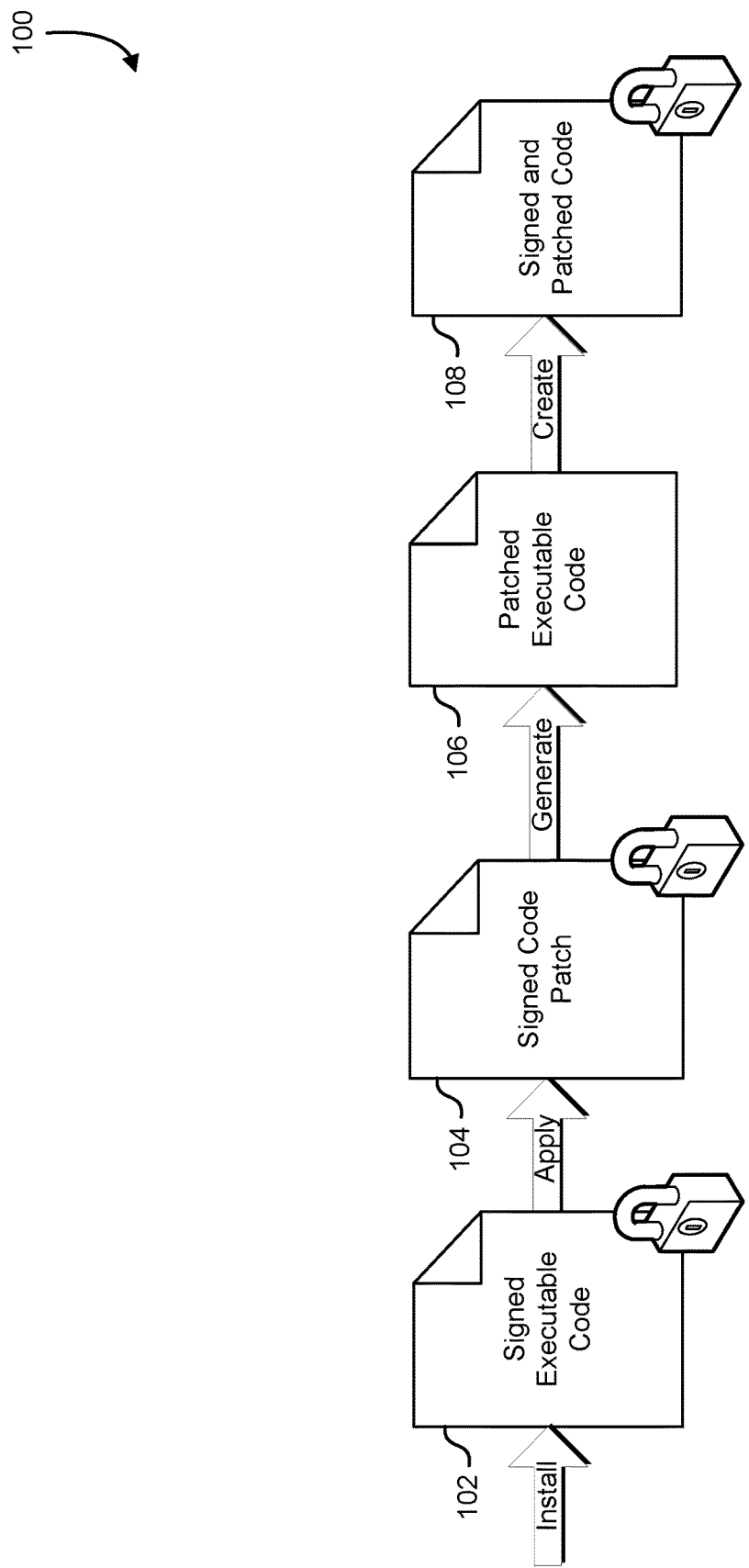
FIG. 1 shows an illustrative example of a process that generates a signed and patched piece of executable code, in an embodiment.

The present document describes a code signing system and method that allows for the signing and verification of patched, updated, or otherwise modified executable images by providing a local certificate authority that authorizes the modifications to signed executables, and then obtains indicators of authenticity (such as trusted digital certificates) and signatures for the resulting modified executable images.

In various examples, when signed code is presented to a computer system for execution, the computer system extracts a digital certificate and a digital signature from the signed code. The digital certificate specifies the identity and public key of the author, and the digital certificate is signed by a certificate authority. The computer system confirms the digital signature of the certificate authority, and also confirms that the certificate authority is recorded as a certificate authority that is trusted by the computer system. In some implementations, trusted certificate authorities are recorded in a trust store maintained by the computer system. Using the public key of the author, the computer system confirms the integrity of the signed code by verifying the digital signature using the public key of the author. If the digital signature on the signed code is correct, the computer system can be reasonably sure that the code is not been corrupted or modified since being produced by the author. If the digital signature on the same code is not correct, or if the digital signature is absent, the computer system does not have an assurance that the code is not been tampered with.

In some situations, it is desirable to modify code once it is installed on the computer system. For example, a piece of signed code may be verified and installed on the computer system, and then modified or patched to customize its operation, fix bugs, enable instrumentation, provide program randomization, or add additional libraries. In general, a modification to signed code will cause the digital signature of that signed code to become invalid. Therefore, it is desirable to provide a control method for applying patches or other modifications to signed code that preserves the cryptographically verifiable nature of the resulting modified code.

In one implementation, a computer system implements a code signing service that acts as a local certificate authority for re-signing patched signed code. Signed code and a compatible signed patch are submitted to the code signing service. The code signing service verifies the integrity of the signed code and the signed patch, and applies a patching policy to determine whether the signed patch is allowed to be applied to the signed code. If the signed patch is allowed to be applied to the signed code, the patch is applied to the signed code, and the code signing service obtains a digital certificate and a new digital signature for the resulting patched code. In some examples, the digital certificate is signed by a local certificate authority operated by the computer system. The computer system is configured to trust the local certificate authority. In some examples, the digital certificate contains copies of the author's information from the original digital certificate, other than the public key, which is generated by the computer system along with the corresponding private key which is used to generate a new signature for the patched code.

In some examples, the system generates a set of certificate extensions that are included with the digital certificate. The certificate extensions maintain a record of the original author's digital certificate and the authorship of any patch is applied to the original signed code.

Patch policies may be maintained in a data store on the client computer system, in a network accessible registry, or in a database of security permissions accessible to the client computer system. In various examples, patch policies record a set of permissible code authors and patch authors whose work may be combined. Patch policies may be specific to a particular application. For example, a particular application may be modifiable by a particular set of patch authors were as another application may be modifiable by different set of patch authors.

As one skilled in the art will appreciate in light of this disclosure, certain embodiments may be capable of achieving certain advantages, including some or all of the following: (1) providing the ability to modify signed code while preserving the security associated with signature verification, (2) controlling the modification of signed executable code in accordance with a set of patch policies, (3) preserving a record of the provenance of the modified code in the digital certificate.

FIG. 1 shows an illustrative example of a process 100 that generates a signed and patched piece of executable code, in an embodiment. In various examples, a computer system uses code signing to ensure the integrity of programs, program configuration data, and executable instructions, before such code is executed on the computer system. For example, when the computer system downloads a program from the Internet, there is a risk that the program may have been tampered with or may be of a malicious nature. Code signing allows the computer system to confirm the source of the program and also confirm that the program is not been modified after being published by the author. In the example shown in FIG. 1, a computer system installs a piece of signed executable code 102. Prior to executing the piece of signed executable code 102, the computer system may verify the integrity of the signed executable code 102 using a digital certificate provided with the signed executable code 102 and a digital signature generated using a cryptographic key associated with a digital certificate. In one embodiment, the computer system verifies that the digital certificate is issued by a trusted certificate authority by validating a digital signature on the digital certificate and verifying that the digital signature is generated by a trusted certificate authority. In various examples, a trusted certificate authority may be established by referring to a trust store (which may be implemented as a protected database). The trust store maintains a list of certificate authorities that are trusted by the computer system by, for example, storing a list of public keys of the trusted certificate authorities. The digital certificate contains information that identifies the author of the source code, and also includes a public key associated with the author. The digital signature on the signed executable code 102 is validated with the public key of the author. If the digital signature is valid, and the digital certificate is valid, the computer system can be reasonably sure that the signed executable code 102 was produced by the author, and that the signed executable code 102 has not been modified by another party. In some examples, various computer systems maintain a list of trusted authors, and a list of trusted authors is used to determine whether the signed executable code 102 is allowed to be executed or installed.

Once a piece of executable code is installed on a computer system, it may become necessary to modify the executable code in order to fix code bugs, configure the software, enable software logging or debugging features, or other reason. Sometimes, a patch to a piece of executable code will be produced by the author, and the author can provide an updated digital certificate and digital signature for the code being patched. In other situations, a patch to a piece of code may be produced by a patch author that is different than the code author, and the patch author will not necessarily have the ability to generate a new digital signature for the code being patched. In some examples, such as the example illustrated in FIG. 1, a signed code patch 104 may be provided. The signed code patch 104 includes a digital certificate and digital signature for the patch itself, and can be verified using a method similar to that used when verifying the executable code, as described above.

In some examples, the computer system uses the information acquired by verifying the signed executable code 102 and the signed code patch 104 to determine whether the patch may be applied. In some implementations, the determination is made in accordance with a set of patch policies maintained by the computer system. In one implementation, the set of patch policies specifies permitted combinations of code authors and patch authors. Such permitted combinations may be specified globally, or may be based on the author of the signed executable code. For example, the computer system may allow any code to be run and any patch to be installed from a specified set of authors. In another example, the computer system may allow code to be patched if the patch author matches the code author. In yet another example, the computer system may specify a set of possible patch authors specific to each code author. In yet another example, the computer system may impose restrictions or limitations on allowable patches based on the content of the digital certificate included with the patch. In yet another example, the computer system may impose patching restrictions on the signed executable code 102 that are based on information included in the digital certificate of the signed executable code 102.

If the computer system determines that the signed code patch 104 is permitted to be applied to the signed executable code 102 in accordance with the set of patch policies, the signed code patch 104 is applied to the signed executable code 102 to produce patched executable code 106. The patched executable code 106 may not include a digital signature or digital certificate, or alternatively may include a digital signature and digital certificate of the patch author. As a result, it may no longer be possible for the computer system to fully verify the integrity and authorship of the resulting patched executable code 106, as the patched executable code 106 may lack a proper digital certificate or digital signature.

In various examples, the lack of a proper digital certificate or digital signature may be remedied through the use of a local certificate authority and code signing service operated by the computer system itself. In one implementation, the computer system operates as a local certificate authority and code signing service. As a result of determining that the signed code patch 104 may be applied to the signed executable code 102, the computer system generates a new digital certificate for the patched executable code 106. The new digital certificate may include a new public-private key pair for the patched executable code 106. In various examples, the computer system may copy subject information from the digital certificates included with the code in the patch to the new digital certificate, so that a record of provenance can be maintained for the resulting patched executable code 106. Using the private key of the public-private key pair, the computer system generates a new digital signature for the patched executable code 106. Using the new digital certificate and the new digital signature, the computer system generates signed and patched code 108. The signed and patched code 108 can be verified and executed in a manner similar to the signed executable code 102 described above, so long as the local certificate authority is represented in the trust store of the computer system. In some implementations, the local certificate authority may be maintained and operated by a trusted authority of the computer system. For example, the trusted certificate authority may be operated by a company IT department, and each computer system in the company IT department may be configured to trust the certificate authority. In this way, a company can control how software on the company's computer systems may be patched and modified.

Figure 2:
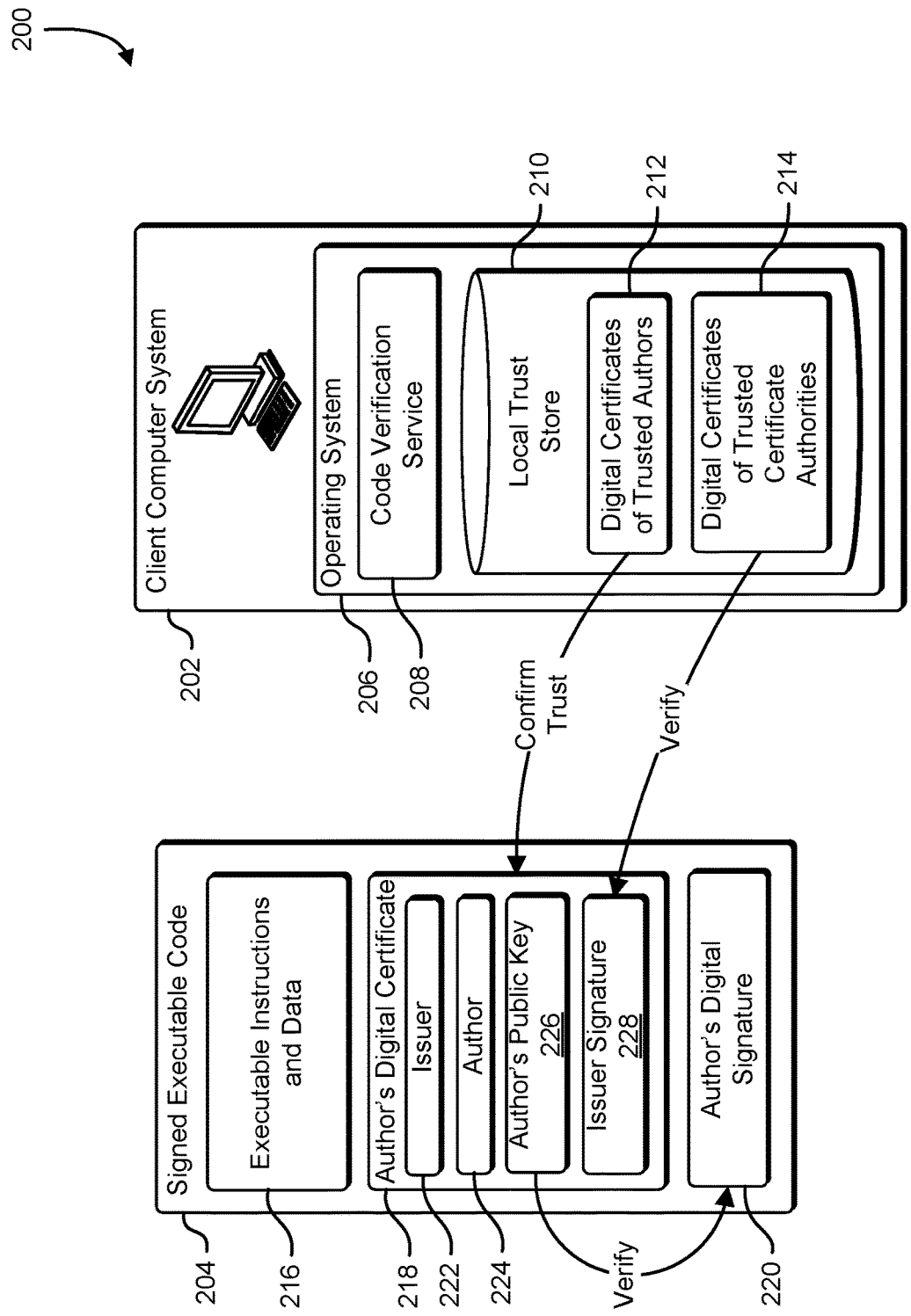
FIG. 2 shows an illustrative example of a client computer system that verifies signed executable code, in an embodiment.

FIG. 2 shows an illustrative example of a system 200 that includes a client computer system 202 that is capable of verifying signed executable code 204. The client computer system 202 can be a personal computer system, a laptop computer system, a cellular phone, handheld computing device, a tablet computer system, a smart watch, an Internet of things ("IoT") device, a virtual computer system, serverless runtime environment, or computing device having a processor and memory for storing executable instructions that can be run by the processor. The client computer system 202 includes an operating system 206. The operating system 206 controls and manages the execution of computer programs or applications. The operating system 206 includes a code verification service 208 that verifies the integrity and authorship of signed executable code submitted to be run on the client computer system 202. In an embodiment, the code verification service 208 verifies the integrity and authorship as described above.

The operating system 206 includes a local trust store 210. The local trust store 210 may be protected such that its contents may be modified by authorized personnel (such as a system administrator), and not by unauthorized personnel. The local trust store 210 is a protected data store or database that identifies a set of trusted certificate authorities and trusted authors. In some examples, trusted certificate authorities and trusted authors may be identified using their respective public keys. In one implementation, the local trust store 210 stores a set of digital certificates of trusted authors 212 and a set of digital certificates of trusted certificate authorities 214.

In an example, when a piece of signed executable code 204 is submitted to be run on the client computer system 202, the code verification service 208 performs a number of cryptographic operations to confirm the identity of the author of the signed executable code 204, and the integrity of the signed executable code 204.

In an illustrative example, the signed executable code 204 includes a set of executable instructions and data 216, an author's digital certificate 218, and an author's digital signature 220. The set of executable instructions and data 216 includes executable instructions that are capable of being executed by the client computer system 202. In some examples, the set of executable instructions and data 216 may be stored in a compressed form that is processed to produce the actual instructions executed by the client computer system 202. The executable instructions and data 216 may include one or more of source code, intermediate code, relocatable code, absolute code, libraries, dynamic libraries, static libraries, interpretable tokens. The author's digital certificate 218 specifies an issuer 222, and author 224, and author's public key 226, and an issuer signature 228. The issuer 222 identifies certificate authority that issued the author's digital certificate 218. The author 224 is subject information that identifies the author of the set of executable instructions and data 216. The author's public key 226 is a public key of a public-private key pair controlled by the author and used to prove authorship. The issuer signature 228 is a digital signature produced using a private key controlled by the certificate authority that issued the author's digital certificate 218. The author's digital signature 220 is a digital signature of the executable instructions and data which is generated with the author's private key.

In one implementation, when the signed executable code 204 is presented to the client computer system 202 for execution, the operating system 206 submits the code to the code verification service 208 to determine whether the code is permitted to be executed on the system. The code verification service 208 is a set of executable instructions that, as a result of being executed by processor on the client computer system 202, cause the client computer system 202 to perform operations on behalf of the code verification service 208. The code verification service 208 extracts the author's digital certificate 218 and the author's digital signature 220 from the signed executable code 204. The code verification service confirms that the issuer 222 is represented in the set of digital certificates that are trusted certificate authorities 214. If the issuer 222 is not trusted, the signed executable code 204 cannot be validated and is not executed by the client computer system 202. If the issuer 222 is a trusted certificate authority, the code verification service 208 uses the issuer's public key to verify that the issuer signature 228 is a correct digital signature for the author's digital certificate 218. If the issuer signature 228 is not correct, the signed executable code 204 is not validated and is not executed by the client computer system 202. If the issuer signature 228 is correct, the code verification service 208 verifies the author's digital signature 220 using the author's public key 226. The author's digital signature 220 is a digital signature of the signed executable code 204. If the author's digital signature 220 is correct, the code verification service 208 determines that the signed executable code originated from the author associated the author 224 indicated in the author's digital certificate 218. If the author's digital signature 220 is not correct, the code verification service 208 indicates that the signed executable code 204 cannot be validated.

The client computer system 202 confirms that the author 224 is represented in the set of digital certificates of trusted authors 212. If the author 224 is not represented in the set of digital certificates of trusted authors 212, the operating system 206 determines that, although the signed executable code 204 is validly signed by the author, the author is not trusted, and prevents the code from being executed. If the author 224 is represented in the set of digital certificates of trusted authors 212, the operating system 206 allows the code to be executed on the client computer system 202. In this way, by way of controlling the contents of the local trust store 210, administrators can control the source of executable code that can be run on the client computer system 202. In various implementations, the local trust store 210 may be substituted with a remotely stored trust store managed by an IT department or other authorized administrator. In some implementations, the local trust store 210 is maintained in protected memory such as a trusted platform module ("TPM").

In various examples, when executable code is not able to be verified, or if the identified author is determined not to be trusted, the computer system may respond in a variety of ways. In some examples, the computer system may prevent the executable code from being executed. In other examples, the computer system may present the author information to the user, and inquire whether the code should be executed. In other examples, the computer system may execute the code in a sandboxed or controlled environment such as a virtual machine or limited-access execution environment.

Figure 3:
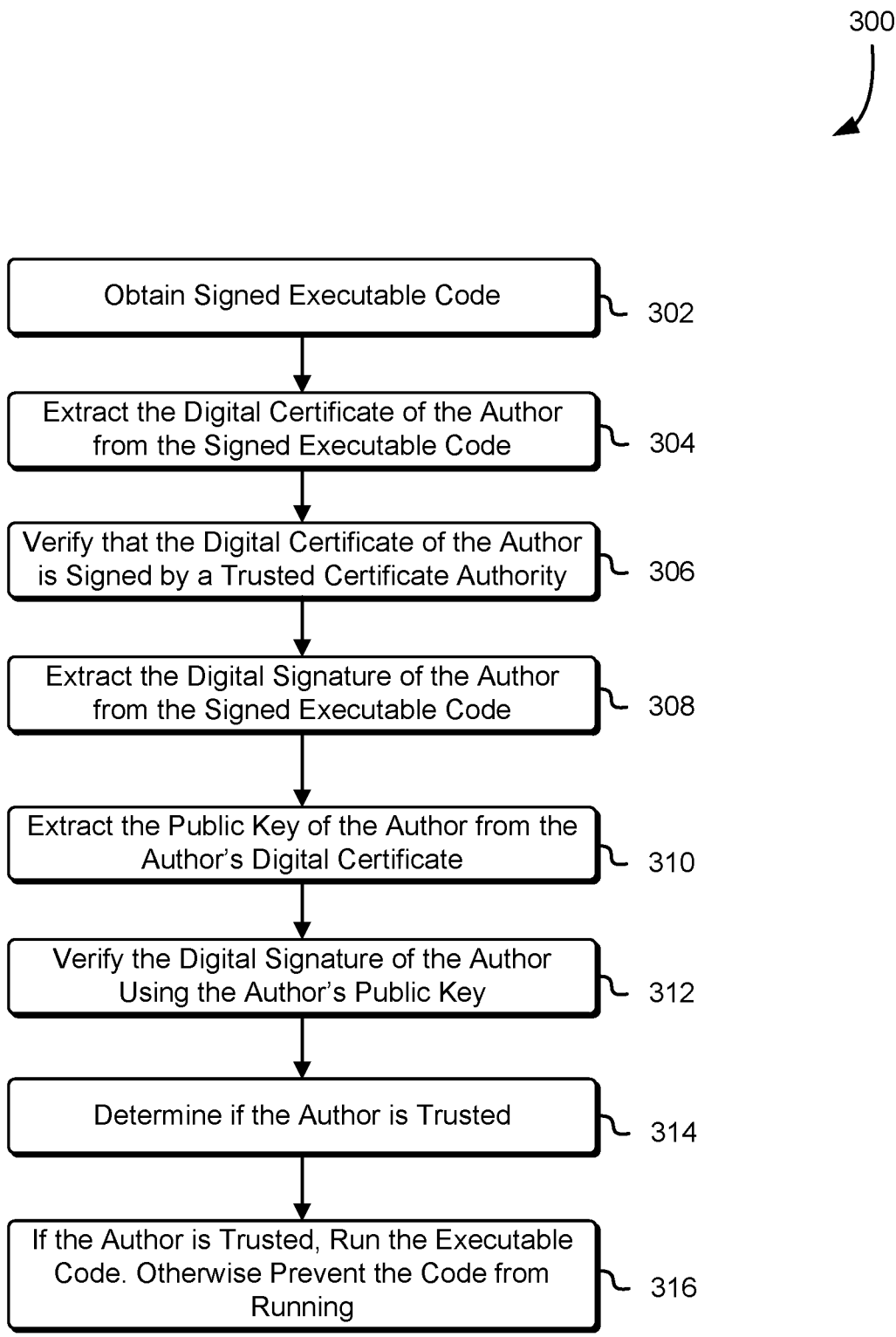
FIG. 3 shows an illustrative example of a process that, as a result of being performed by a computer system, verifies the integrity of signed executable code, in an embodiment.

FIG. 3 shows an illustrative example of a process 300 that, as a result of being performed by a computer system, verifies the integrity of signed executable code, in an embodiment. The process begins at block 302, with the computer system obtaining a piece of signed executable code. For example, a piece of signed executable code may be downloaded from the Internet and installed by a user, or a piece of signed executable code may be installed by a system administrator or user. The signed executable code may be a piece of executable code as illustrated in FIG. 2, which includes a digital certificate and a digital signature generated by a code author. In the present document, the term author may refer to a publisher, distributor, or other provider of a document. The computer system may be a client computer system, server computer system, virtual computer system, handheld computer system, a cellular phone, wearable device, or computing entity with a processor capable of executing executable code.

At block 304, the computer system extracts a digital certificate from the signed executable code. In an embodiment, the digital certificate is attached to the signed executable code by the author when the code is signed. The computer system may extract the digital certificate by copying the digital certificate from the file containing the signed executable code. In some examples, the executable code may include an identifier such as a uniform resource locator ("URL") or subject name, and the computer system retrieves the digital certificate from another source using the identifier.

At block 306, the computer system verifies that the digital certificate is properly signed by a trusted certificate authority. In some examples where asymmetric cryptography is used, a digital signature is verified by calculating a hash of the signed data (the digital certificate), decrypting the digital signature with the public key, and then comparing the decrypted digital signature to the hash value. If the values match, the digital signature was generated with the private key, and is valid (properly signed). Whether a particular certificate authority is trusted may be determined by consulting a trust store maintained by the computer system. In one example, the digital certificate includes a digital signature generated by the issuer of the digital certificate. Verification of the digital signature is accomplished using a public key associated with the issuer. Determining that the issuer is a trusted certificate authority is determined by locating the public key in the trust store. If the computer system determines that the digital certificate is not signed by trusted certificate authority, or if the computer system determines that the digital certificate is not properly signed, the computer system may prevent signed executable code from running.

At block 308, the computer system extracts the digital signature of the author from the signed executable code. The digital signature of the author is generated by the author (or publisher or distributor) using a private key of a public-private key pair associated with the author. In some examples, the digital signature is appended to the end of the piece of signed executable code. In one example, the digital signature is a cryptographic signature of the executable code and the digital certificate. In another example, the digital signature is a cryptographic signature of the executable code that excludes the digital certificate.

In an example, the digital certificate included with the signed executable code includes a public key of a public-private key pair associated with the author of the signed executable code. At block 310, the computer system extracts the public key of the author from the digital certificate. Using the extracted public key, at block 312, the computer system verifies the digital signature of the signed executable code. In one implementation verifying the digital signature may be accomplished by performing the signature computation algorithm on the executable code using the public key, and comparing the result to the digital signature included with the signed executable code. If the digital signature is not valid, the computer system may prevent the executable code from being run on the computer system.

At block 314, the computer system determines if the author is trusted. Determining whether the authors trusted may be accomplished by consulting a database of trusted authors in a trust store or other storage area. In some embodiments, if the computer system is unable to determine whether the author is trusted by consulting information in a trust store, the computer system may present a prompt to the user or an administrator requesting guidance on whether the author should be trusted (or whether the executable instructions should be nonetheless executed). At block 316, if the author is determined to be trusted, the code is executed on the computer system. If the author is not determined to be trusted, the code is not executed.

Figure 4:
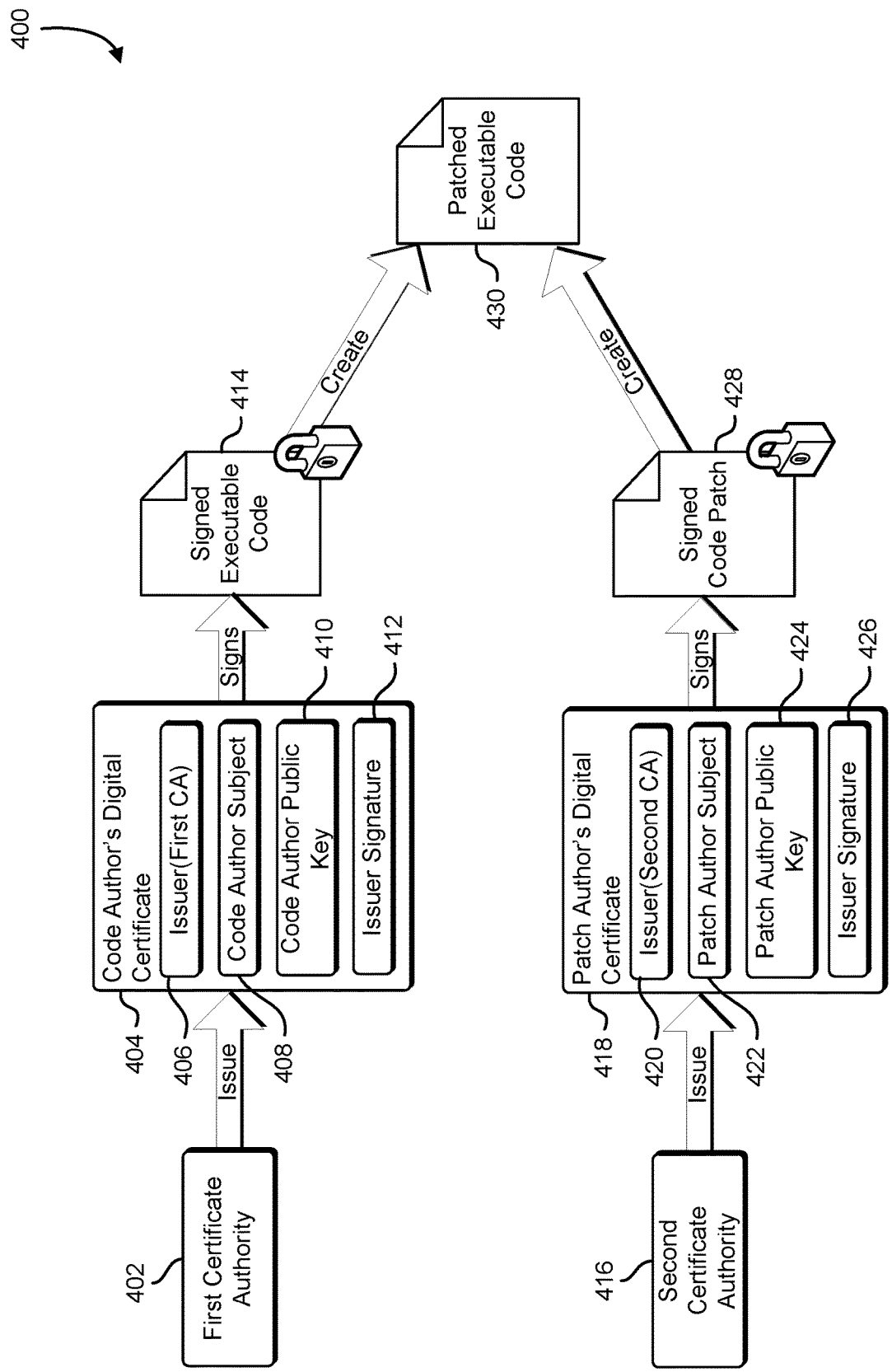
FIG. 4 shows an illustrative example of a process used to generate a piece of patched executable code, in an embodiment.

FIG. 4 shows an illustrative example of a process 400 used to generate a piece of patched executable code, in an embodiment. After creating a piece of executable code, a code author submits a request to a first certificate authority 402 for digital certificate that can be used by the author to prove authorship of the executable code. In response to the request from the author, the first certificate authority verifies various identifying information provided by the author, and then issues a code author's digital certificate 404. The code author's digital certificate 404 specifies an issuer 406 (the first certificate authority), a code author subject 408 (identifying the author), a code author public key 410 (of a public-private key pair available to the author), and an issuer signature 412 (generated by the first certificate authority using the certificate authority's private key).

Using the private key that is associated with the public key in the code author's digital certificate 404, the code author generate the digital signature for the piece of signed code. The code author assembles the digital certificate, the digital signature, and the executable code into a signed executable code 414. In some examples, the executable code, the digital certificate, and the digital signature are concatenated to form the signed executable code 414.

In some examples, a similar process may be used to generate a signed patch. A patch may be comprised of information that specifies a differential update to a separate piece of executable code. Patches may be used to address bugs in a piece of executable code, to add features to a piece of executable code, or to customize the operation of a piece of executable code. In various examples, a patch may be generated by the author of a piece of code. In other examples, the patch may be generated by an author different than the author of the piece of code.

A patch author requested digital certificate from a second certificate authority 416. The second certificate authority 416 confirms various identifying information provided by the patch author and then issues a patch author's digital certificate 418. The patch author's digital certificate specifies an issuer 420 (the second certificate authority), a patch author subject 422, a patch author public key 424, and an issuer signature 426 (the second certificate authority). Using a private key associated with the patch author public key 424, the patch author generates the digital signature for a patch. The patch, the patch author's digital certificate 418, and the digital signature are combined to create a signed code patch 428.

The signed executable code 414 and the signed code patch 428 may be distributed to a computer system for installation and execution. As described above, both the signed executable code 414 and the signed code patch 428 are cryptographically verified by a computer system to verify that they have not been modified and that they are generated by trusted authors. If both the signed executable code 414 and the signed code patch 428 are successfully verified, the computer system applies the signed code patch 428 to the signed executable code 414 to produce patched executable code 430. If the computer system does not have access to the private cryptographic keys used to generate the original digital signatures on the signed executable code 414 and the signed code patch 428, the computer system will not be able to re-create a valid signature for the patched executable code 430 using either of the digital certificates. As a result, additional steps may be taken as described below to restore the ability of the computer system to cryptographically verify the patched executable code 430.

Figure 5:
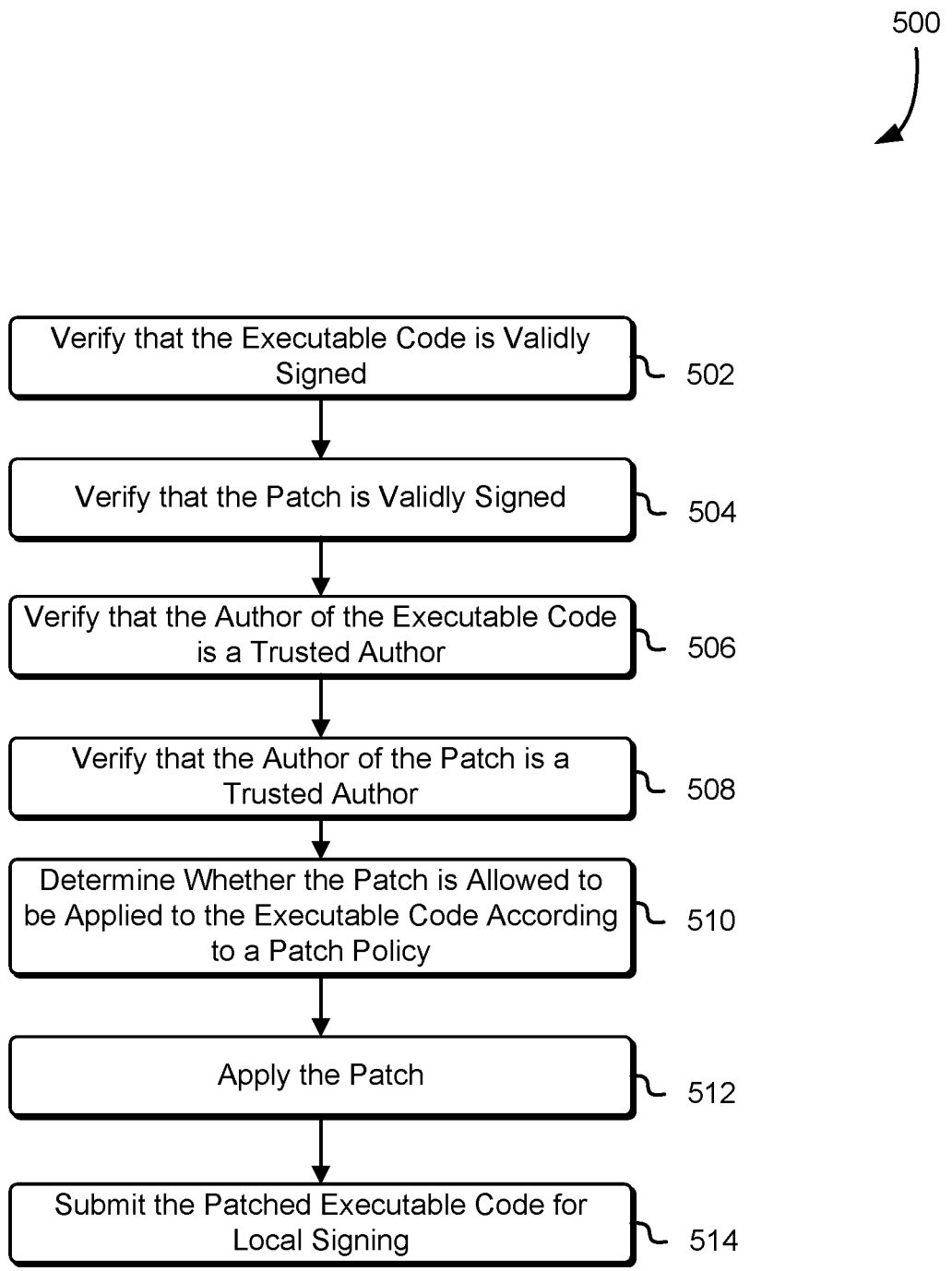
FIG. 5 shows an illustrative example of a process that, as a result of being performed by a computer system, creates a piece of patched code from a signed executable and a signed patch, and submits the patched code for signing, in an embodiment.

FIG. 5 shows an illustrative example of a process 500 that, as a result of being performed by a computer system, creates a piece of patched code from a signed executable and a signed patch, in an embodiment. At block 502, a computer system verifies that the piece of executable code is validly signed. At block 504, the computer system verifies that a patch to be applied to the piece of excitable code is validly signed. For example, specific methods for determining that a piece of code (or patch) is validly signed are described elsewhere in the present document. If the computer system determines that either the piece of executable code or the patch is not validly signed, the computer may take various mitigating steps such as refusing to apply the patch to the piece of excitable code, warning the user that integrity of the executable code or a patch cannot be confirmed, or requesting confirmation that the patch should nonetheless be applied.

At block 506, the computer system verifies that the author of the executable code is a trusted author, and at block 508, the computer system verifies that the author of the patch is a trusted author. Determining that an author is trusted may be accomplished by verifying the identity of the author using a digital certificate as described above, and then verifying that the author is represented in a data store of trusted authors such as a trust store as described elsewhere in the present document.

At block 510, the computer system determines whether the patch is allowed to be applied to the executable code. In one example, a set of patch policies is maintained by the computer system. The set of patch policies includes a set of rules that can be applied to determine whether a particular patch is allowed to be applied to a particular piece of executable code. For example, the patch policies may include rules that specify a set of allowed patch authors and allowed executable code authors. In another example, patch policies may include a set of code author/patch author combinations that are allowed. In yet another example, the patch policies may identify the particular set of patch authors that are allowed for each executable. Some embodiments may use combinations of one or more of these patch policies. If the computer system determines, based on the patch policies, that the patch may not be applied to the piece of executable code, the system will not apply the patch. If the computer system determines, based on the patch policies, that the patch may be applied to the piece of execrable code, the system applies 512 the patch to the piece of executable code to produce a piece of patched executable code. In various examples, the patch may be applied regardless of the patch policy, and an unsigned patched piece of executable code may be produced.

In an embodiment, at block 514, provided the patch policies allow the patch to be provided to the piece of executable code, the computer system submits the patched executable code to a code signing service in the operating system of the computer system. The code signing service generates a new digital certificate and a digital signature for the patched executable code. The computer system combines the patched executable code, the new digital certificate, and the digital signature to generate signed patched executable code that can be verified by the computer system as described elsewhere in the present document.

Figure 6:
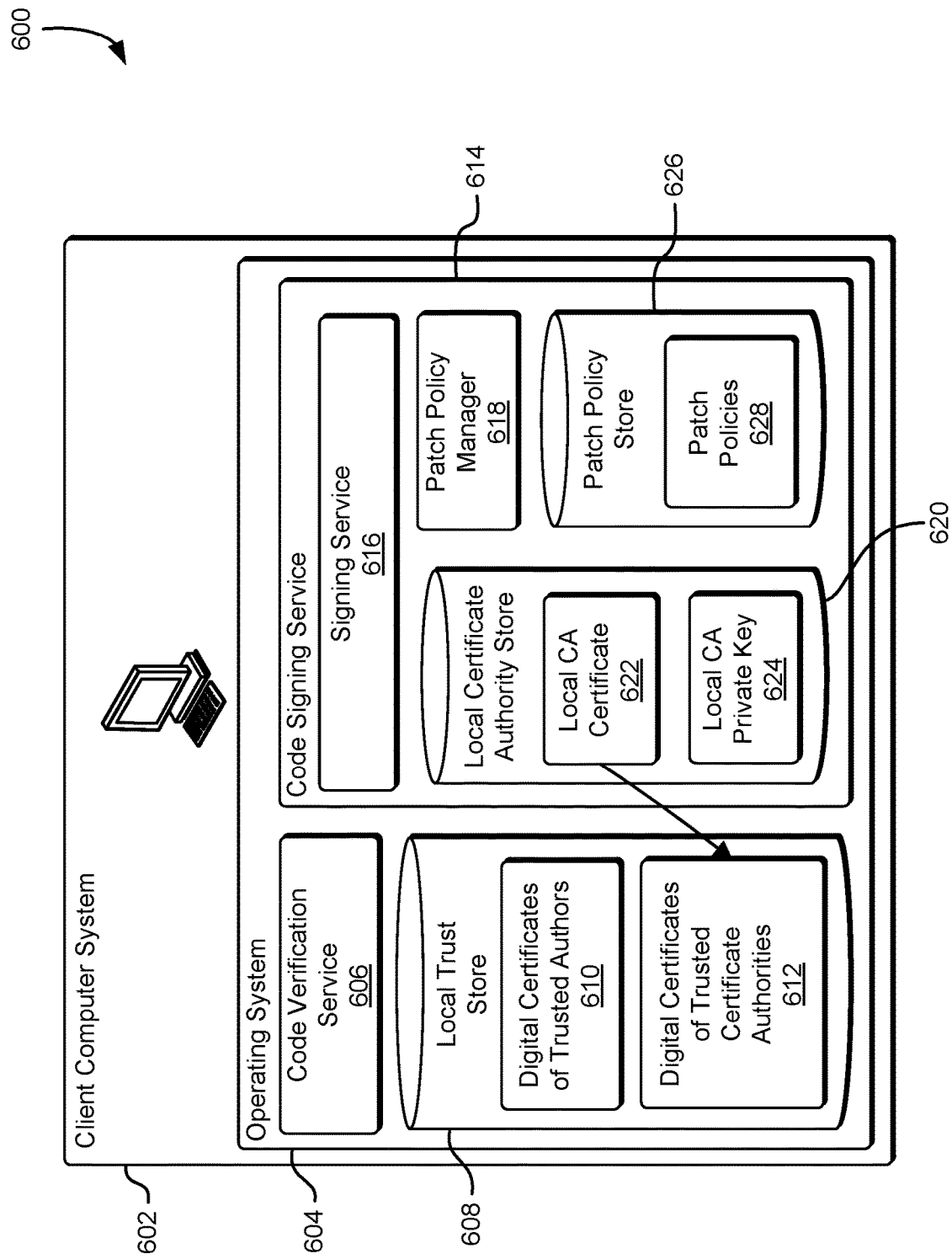
FIG. 6 shows an illustrative example of a client computer system that supports the generation and verification of signed patched code, in an embodiment.

FIG. 6 shows an illustrative example of a client computer system that supports the generation and verification of signed patched code, in an embodiment. A system diagram 600 illustrates various components of a client computer system 602. The client computer system 602 may be a personal computer system, server computer system, virtual computer system, handheld computer system, a networking device, and embedded computer system, a serverless runtime environment, or a computing entity with a processor and memory for storing executable instructions that can be executed by the processor.

The client computer system 602 hosts an operating system 604 that manages the execution of programs. The operating system 604 includes a code verification service 606. The code verification service 606 is a set of executable instructions stored in a memory on the client computer system 602 that, when executed by a processor on the client computer system 602, cause the client computer system 602 to cryptographically verify executable code prior to execution, as described above. The code verification service 606 uses information from a local trust store 608 to determine whether executable code is allowed to be executed on the client computer system 602. In one implementation, the local trust store 608 includes a set of digital certificates of trusted authors 610 and a set of digital certificates of trusted certificate authorities 612. Individual trusted authors and trusted certificate authorities may be represented in the trust store by their respective public keys.

In various examples, the operating system 604 includes a code signing service 614. The code signing service 614 includes various sets of executable instructions and store data that work together to cause the client computer system 602 to reapply a digital certificate and digital signature to unsigned patched executable code produced as a result of applying a patch to signed executable code. In one implementation, the code signing service 614 includes a signing service 616, and a patch policy manager 618. The signing service 616 is a service that receives unsigned executable code, and applies a new digital certificate and digital signature to produce a signed executable code that is properly signed using a certificate provided by a local certificate authority controlled by the signing service 616. The signing service 616 uses information maintained in a local certificate authority store 620. The local certificate authority store 620 stores a local certificate authority certificate 622 and a local certificate authority private key 624. Using the information in the local certificate authority store 620, the signing service 616 is able to generate new digital certificates for the unsigned executable code (such as using the methods described above). For example, when signed executable code is patched to produce unsigned patched executable code, the signing service 616 generates a new digital certificate for the unsigned patched executable code using information from the digital certificates associated with the signed executable code and the patch. In order to facilitate the verification of signed patched executable code that is generated by the signing service 616, the local certificate authority certificate 622 is represented in the set of digital certificates of trusted certificate authorities 612. In this way, when the resulting signed patched executable code is presented to the operating system for execution, the code verification service 606 is able to determine that the new digital certificate and new digital signature are trusted.

The code signing service 614 includes a patch policy manager 618. The patch policy manager works with the signing service 616 to determine whether, in some implementations, a particular patch may be applied. In other implementations, the patch policy manager 618 works with the signing service 616 to determine whether the signature should be applied to the resulting patched executable code. The patch policy manager 618 determines whether a patch should be applied using a set of patch policies 628 that are stored in a patch policy store 626. The set of patch policies 628 may include a list of permitted code authors and a list of permitted patch authors. In some examples, the set of patch policies 628 may include a list of authors that are not permitted. In some examples, patch policies are described in terms of permitted combinations of patch authors and code authors. For example, a patch policy may describe that code produced by a particular author may be patched by a particular set of patch authors. In some examples, patch policies may be particular to a particular piece of executable code. For example, a particular piece of executable code may specify a set of allowed patch authors. In one implementation, the digital certificate of the signed executable includes information that specifies a set of allowed patch authors.

In one example, when a piece of signed executable code is presented to the client computer system 602 for execution, the operating system 604 submits the code to the code verification service 606. The code verification service 606 uses the information in the local trust store 608 to verify the digital certificate and the digital signature on the signed executable code as described above.

In another example, when a patch is applied to a piece of signed executable code by the operating system 604, the operating system submits the code to the code signing service 614. The signing service 616 provides the information related to the patch and the original signed code to the patch policy manager 618. The patch policy manager 618 applies the set of patch policies 628 to determine whether the patch is permitted to be signed. If the patch is permitted to be signed, the signing service 616 generates a new digital certificate for the patched executable. The new digital certificate includes a public key of a public-private key pair available to the signing service 616. The private key of the public-private key pair is used to generate a new digital signature for the patched executable. The new digital certificate is signed using the local certificate authority private key 624 (which is a trusted certificate authority because the local certificate authority certificate 622 is represented in the set of digital certificates of trusted certificate authorities 612). The signing service 616 combines the patched executable, the new digital certificate and the new digital signature to produce a signed patched executable code that can be verified by the code verification service 606.

Figure 7:
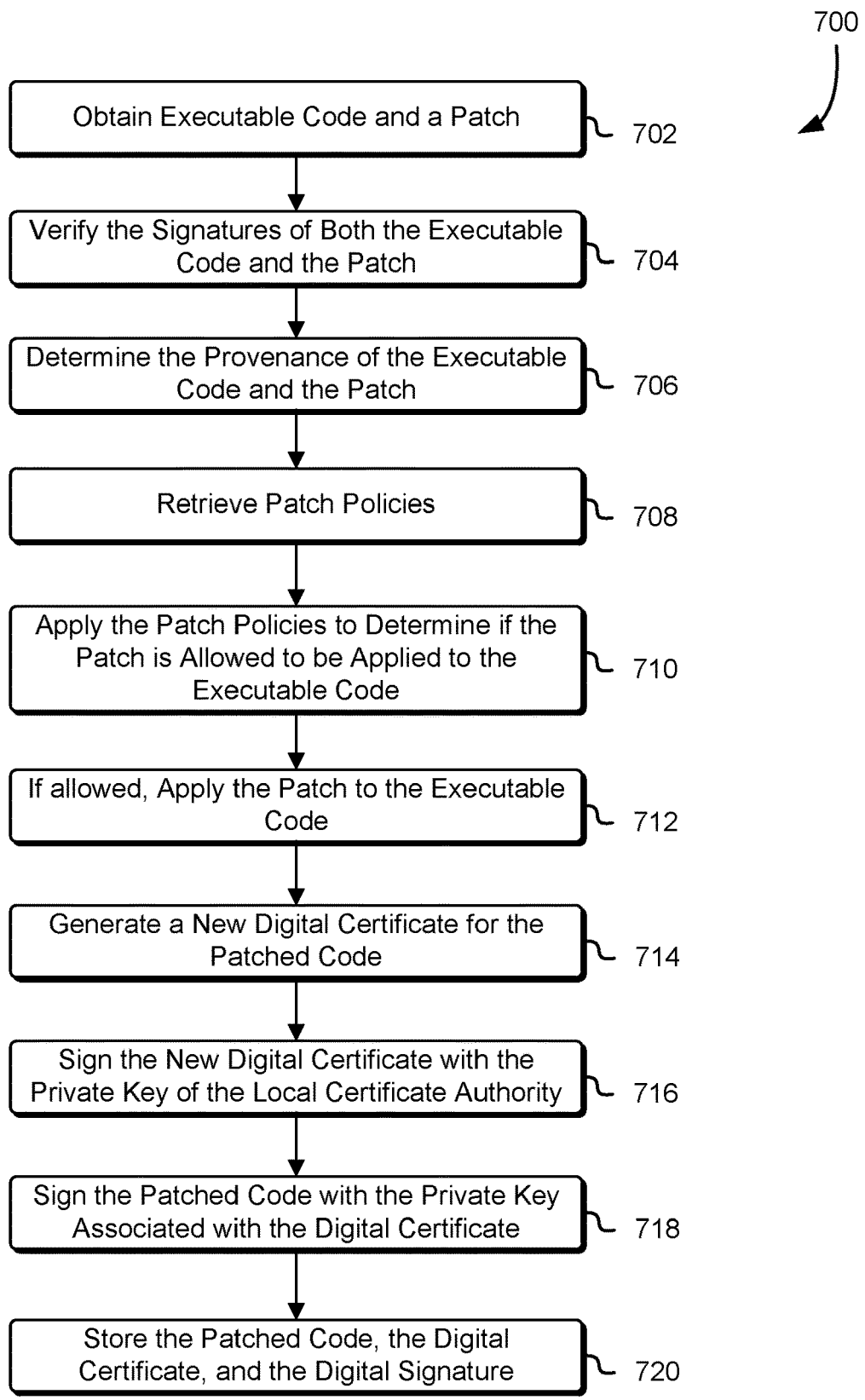
FIG. 7 shows an illustrative example of a process that, as a result of being performed by a computer system, generates signed patched executable code, in an embodiment.

FIG. 7 shows an illustrative example of a process 700 that, as a result of being performed by a computer system, generates signed patched executable code, in an embodiment. The process begins at block 702 with the computer system obtaining the piece of signed executable code, and a patch to be applied to the signed executable code. In some embodiments, the patch may also be signed. At block 704, the computer system verifies the integrity of both the signed executable code and the patch (if the patch is signed). If either the signed executable code or the patch cannot be verified, the computer system stops performing the process. At block 706, the computer system determines the provenance of the signed executable code and the patch. Provenance is the history of the item, and may include authorship and patch history of both the signed executable code in the patch. For example, the provenance of signed executable code may include authorship information, version information, and the identity of previous patches applied to the signed executable code. Provenance of the patch may include the author of the patch.

At block 708, the computer system receives a set of patch policies. The computer system analyzes the provenance in the context of the patch policies to determine whether the patch is allowed to be applied to the executable code. The set of patch policies may include a variety of policy types as described elsewhere in the present document. If the computer system determines that the patch is not allowed to be applied to the signed executable code, the computer system stops performing the process at block 710. At block 712, if the patch is determined to be allowed, the computer system applies the patch to the signed executable code to produce patched executable code. At block 714, the computer system generates a new digital certificate for the patched code using a local certificate authority under the control of the computer system. The new digital certificate may include information copied from the digital certificate of the signed executable code and optionally the signed patch. The new digital certificate includes a public key of a public-private key pair available to or generated by the computer system. The new digital certificate is signed 716 using the private key of the local certificate authority which is under the control of a computer system.

At block 718, using the private key of the public-private key pair, the computer system generates a digital signature for the patched code. At block 720, the computer system stores the patched code, the digital certificate, and the digital signature to create patched signed executable code that can be verified by the computer system. In some examples, the local certificate authority may be trusted by a plurality of other computer systems that trust the computer system to generate signed executable code. For example, the computer system may be a server operated by the IT department of a business, and client computer systems within the business are configured to trust the local certificate authority so that signed executables generated by the computer system may be distributed to other client computer systems in the business.

The link between a particular cryptographic key and a particular user or other entity can be established in a variety of ways using information that provides an indication of authenticity. In the present document, digital certificates are used as an indication of authenticity. Other indicators of authenticity may also be used in place of or in addition to digital certificates. Alternatives may include self-signed certificates, web of trust ("WoT") services, or public key infrastructures ("PKI").

Figure 8:
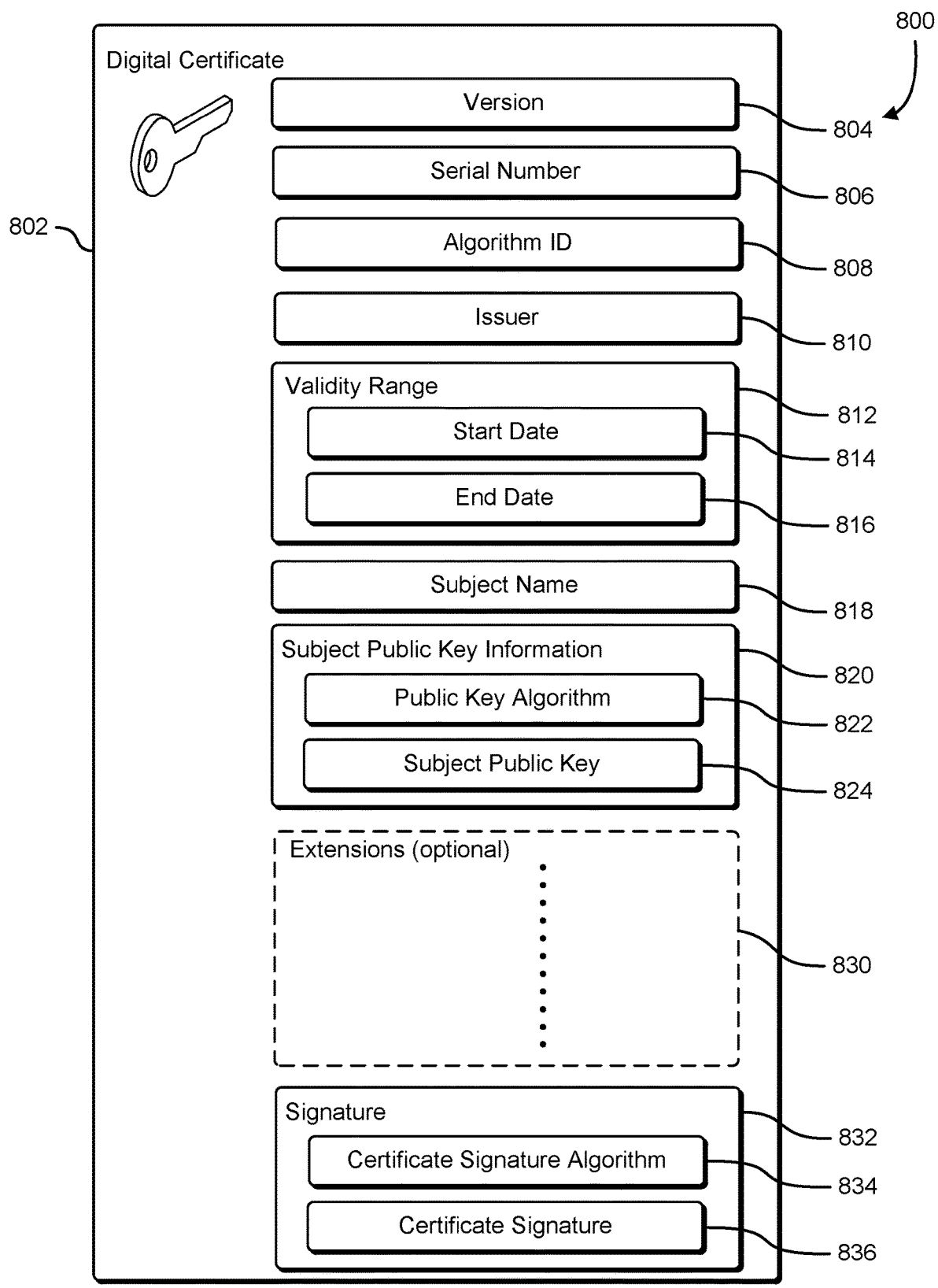
FIG. 8 shows an illustrative example of a digital certificate, in accordance with an embodiment.

FIG. 8 shows an illustrative example of a digital certificate, in accordance with an embodiment. A data diagram 800 illustrates an embodiment of a digital certificate 802 that may be used to produce signed executable code, such as an X.509 digital certificate. The structure of an X.509 digital certificate is described in RFC 5280 which is hereby incorporated by reference. The digital certificate 802 includes a version field 804, a serial number field 806, an algorithm ID field 808, an issuer field 810, a validity range 812 with a start date 814 and an end date 816, a subject name 818, and subject public key information 820. The version field 804 describes the version of the structure of the digital certificate 802. For example, for an X.509 certificate the version field 804 can specify a version of 3 when extensions are used with the digital certificate 802. The serial number field 806 holds an identifier assigned by and issuing certificate authority that is unique to each issued certificate. An algorithm ID field 808 contains an algorithm identifier that specifies an algorithm that is used by the certificate authority to sign the digital certificate 802. Various signature algorithms are specified in RFC 3279, RFC 4055, and RFC 4491, which are herein incorporated by reference, but other signature algorithms may also be specified. The issuer field 810 identifies the entity that has signed and issued the digital certificate 802. The validity range 812 specifies a range of time for which the digital certificate 802 is valid. In one example, the validity range 812 specifies a start date 814, and an end date 816 for the validity period of the digital certificate 802. The subject name 818 identifies the entity associated with the public key identified in the subject public key information 820. The subject public key information 820 specifies a public key algorithm 822 and a subject public key 824. The public key algorithm 822 identifies the particular algorithm used to generate the subject public key 824. The public key algorithm 822 may be an algorithm specified in RFC 3279, RFC 4055, RFC 4491, or cryptographic signature algorithm.

In various examples, the digital certificate 802 can include one or more optional extensions. A list of optional extensions 830 can include one or more extensions that define attributes usable by a certificate user to determine provenance of an associated subject such as a piece of signed executable code. In one example, an attribute extension is added by an issuing certificate authority to indicate that the digital certificate was issued on the basis of one or more previous digital certificates such as a digital certificate of a code author and a patch author. In another example, an attribute extension is provided that adds additional description of the subject of the digital certificate 802.

The digital certificate 802 includes a signature 832. The signature 832 includes a certificate signature algorithm 834 and a certificate signature 836. The certificate signature algorithm 834 is an identifier that identifies an algorithm used to generate the signature 832. The algorithm may be an algorithm specified in RFC 3279, RFC 4055, RFC 4491, or other cryptographic signature algorithm. The signature 832 is generated by the entity identified by the subject name 818, using a private key associated with the subject public key information 820.

A computer system can use can any of the attributes shown for the digital certificate 802, as well as other X.509 certificate attributes to provide additional functionality when performing authentication operations. In addition, digital certificates may be extended to include additional attributes, and the additional attributes may be used by the certificate user when generating a new digital certificate for signed patched executable code.

Figure 9:
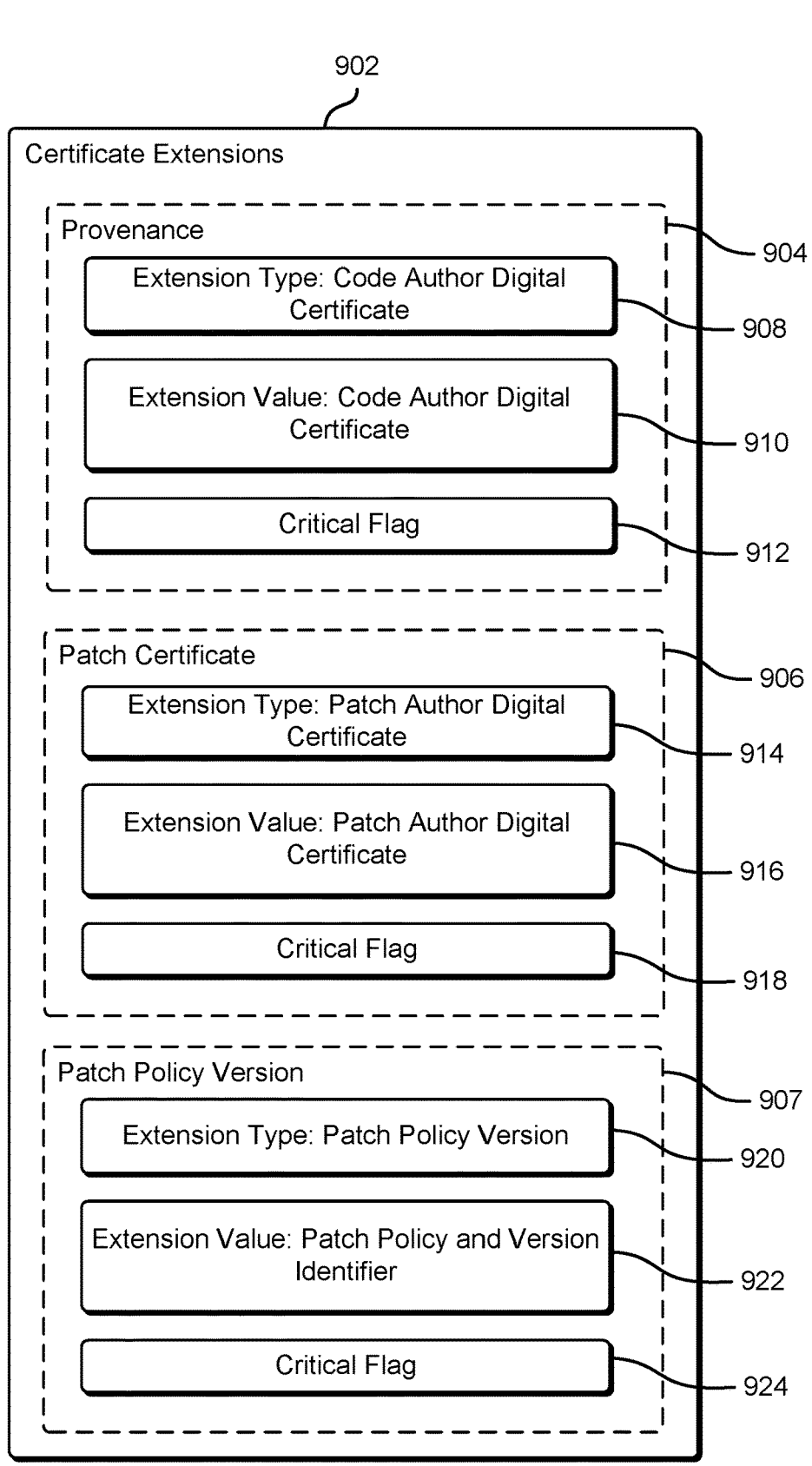
FIG. 9 shows an illustrative example of extensions that may be added to a digital certificate, in accordance with an embodiment.

FIG. 9 shows an illustrative example of extensions that may be added to a digital certificate, in accordance with an embodiment. A diagram 900 illustrates the structure of an attribute extension 902 to a digital certificate. The attribute extension 902 includes a first certificate extension 904, a second certificate extension 906, and a third certificate extension 907.

The first certificate extension 904 includes a first type field 908, a first value field 910, and a first critical flag 912. In the illustrated example, the first type field 908 specifies that the first certificate extension 904 identifies a code author associated with the digital certificate. The first value field 910 contains the digital certificate of the original signed source code. In some examples, the first critical flag 912 is set to a value of false. When a critical flag is set to a value of false, the recipient of a digital certificate need not understand or process the information in the extension.

The second certificate extension 906 includes a second type field 914, a second value field 916, and a second critical flag 918. The second type field 914 indicates that the second certificate extension 906 identifies a patch author associated with the digital certificate. The second value field 916 identifies the author of the patch that was applied to the signed executable code. In some examples, the second critical flag 918 is set to false.

The second certificate extension 906 includes a third type field 920, a third value field 922, and a third critical flag 924. The third type field 920 indicates that the third certificate extension 906 identifies a patch policy and version. The third value field 922 identifies the patch policy and version of the policy used to authorize the application of the patch to the signed executable. In some examples, the second critical flag 918 is set to false.

By including the above extensions in the new digital certificate created for a piece of patched signed executable code, computer systems can determine the provenance of the code after it has been re-signed. In various embodiments, this information can be used as part of a patch rule to further refine whether additional patches can be applied to the executable code.

Figure 10:
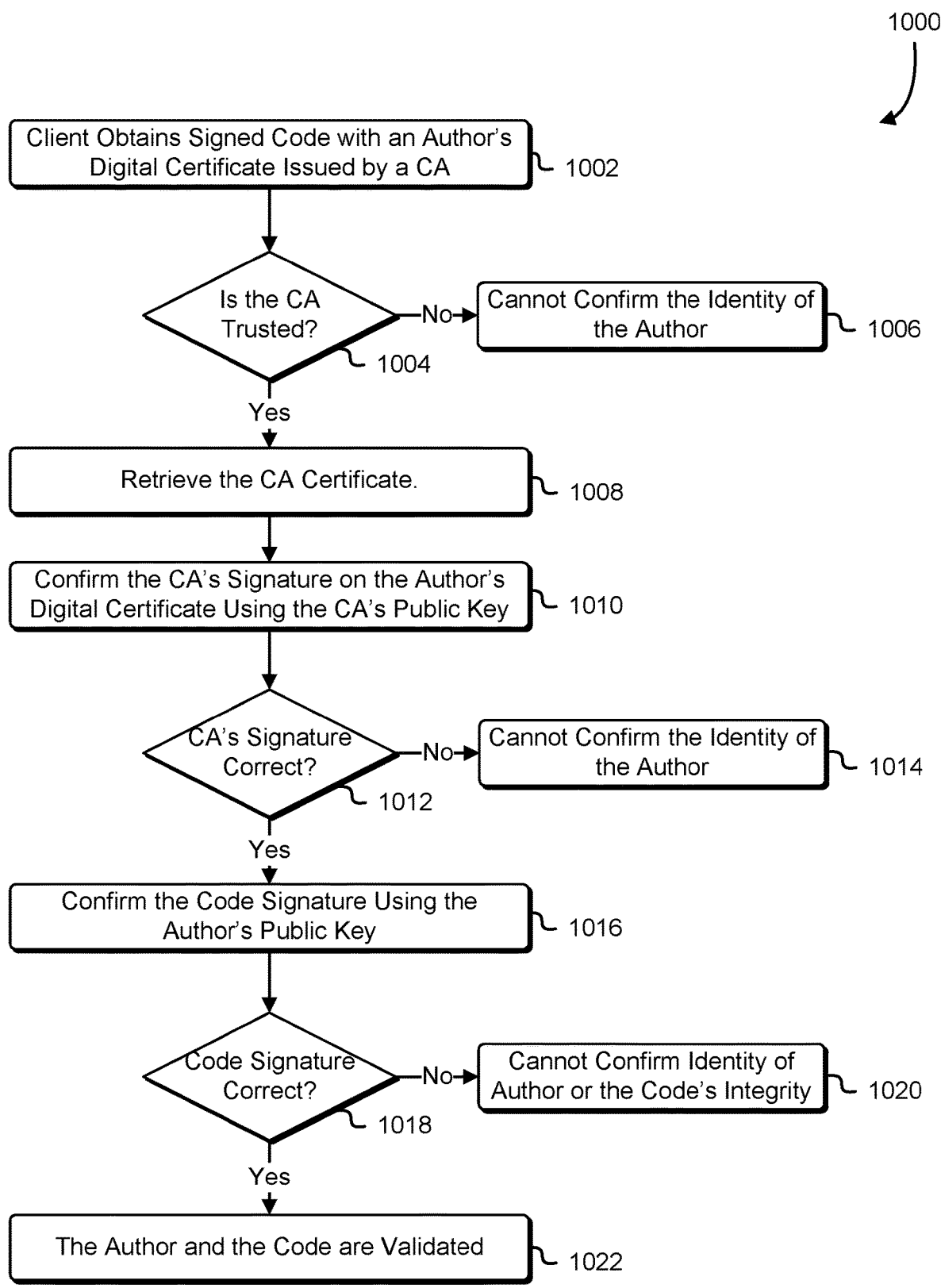
FIG. 10 shows an illustrative example of a process that, when performed by a computer system, obtains and verifies the integrity of a piece of signed executable code using a digital certificate, in accordance with an embodiment.

FIG. 10 shows an illustrative example of a process 1000 that, when performed by a computer system, acquires and validates the integrity of a piece of signed executable code using a digital certificate, in accordance with an embodiment. The process begins at block 1002 with a computer system obtaining a piece of signed code which includes a digital certificate issued to the author, and a digital signature generated by the author. At decision block 1004, the computer system determines whether the certificate authority that issued the digital certificate is a trusted certificate authority. If the certificate authority is trusted by the computer system, execution advances to block 1008. If the certificate authority is not trusted by the computer system, execution advances to block 1006 and the computer system is unable to verify the identity of the author of the signed executable code.

At block 1008, the computer system retrieves the certificate of the certificate authority. The certificate of the certificate authority may be retrieved from a trust store or from another trusted source based on information in the digital certificate provided with the signed executable code. The certificate of the trusted certificate authority includes a public key of the trusted certificate authority. Using the key of the trusted certificate authority, the computer system confirms 1010 the certificate authority's signature on the author's digital certificate.

At decision block 1012, if the computer system determines that the certificate authority's signature is not valid, execution advances to block 1014, and the computer system is unable to confirm the identity of the author. If the computer system determines that the certificate authority signature is valid, execution advances to block 1016. At block 1016, the computer system confirms the digital signature on the signed executable code using the public key in the author's digital certificate. At decision block 1018, if the digital signature on the signed executable code is not valid, execution advances to block 1020 and the computer system is unable to confirm the identity of the author. If the digital signature on the signed executable code is valid, execution advances to block 1022. At block 1022, the computer system has determined that the digital certificate is the digital certificate of the author, and that the digital signature on the piece of signed executable code was generated by the author. As a result, the computer system can be reasonably sure (limited by the extent that the trusted certificate authority is trusted) that the signed executable code was produced by the author, and that it was not modified after the author applied the digital signature.

The trust of a digital certificate can be established by way of a chain of trust. For example, if digital certificate is signed by a first certificate authority, and the certificate of the first certificate authority is signed by a second certificate authority that is trusted by computer system, the digital certificate may be trusted indirectly through the chain of trust from the first certificate authority to the second certificate authority.

Figure 11:
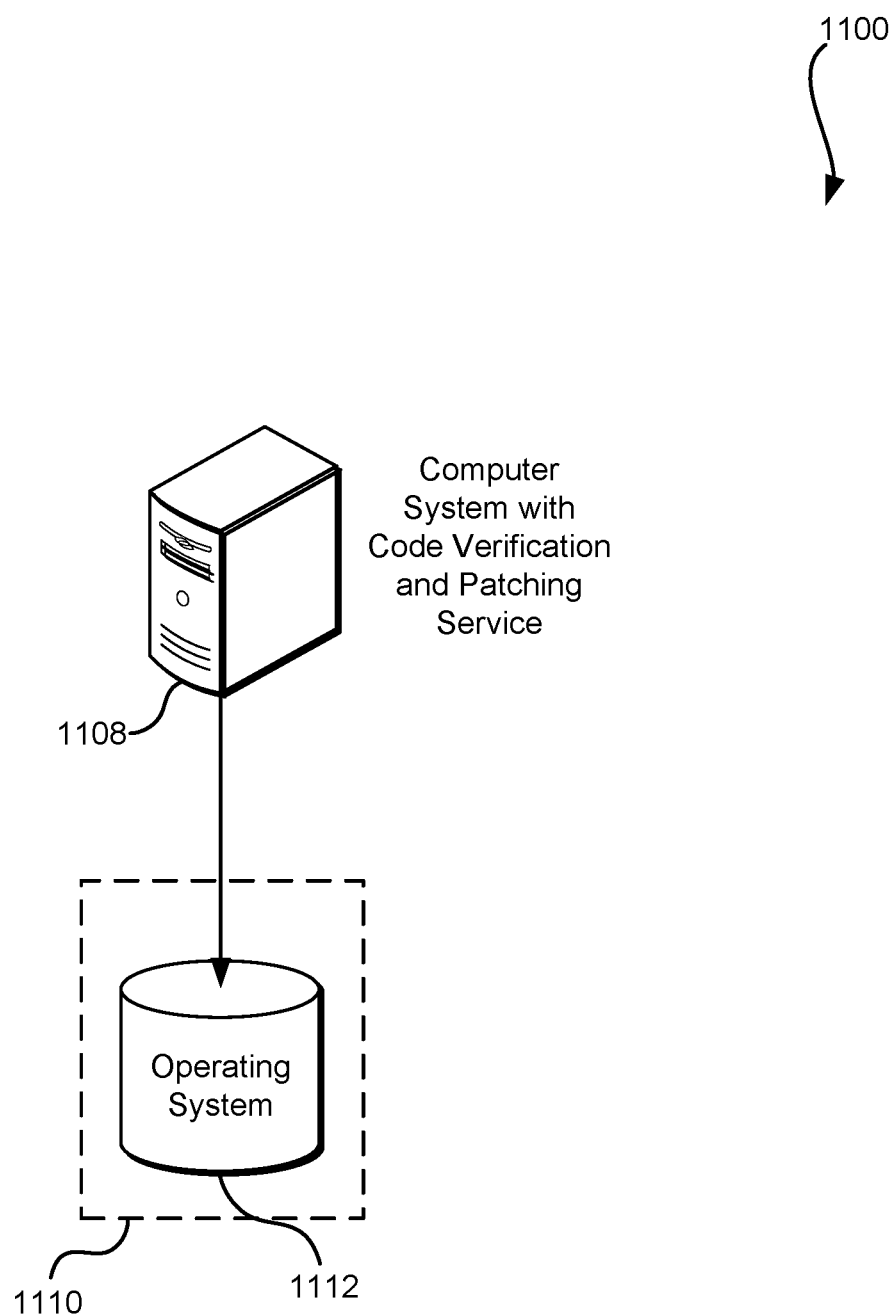
FIG. 11 illustrates a system in which various embodiments can be implemented.

FIG. 11 illustrates aspects of an example system 1100 for implementing aspects in accordance with an embodiment. The illustrative system includes at least one computer system 1108 and a data store 1110. The computer system may be implemented using personal computers, cellular or other mobile phones, handheld messaging devices, laptop computers, tablet computers, set-top boxes, personal data assistants, embedded computer systems, electronic book readers, and the like.

The computer system 1108 may be connected to a computer network. In an embodiment, the network includes any appropriate network, including an intranet, the Internet, a cellular network, a local area network, a satellite network or any other such network and/or combination thereof and components used for such a system depend at least in part upon the type of network and/or system selected. In an embodiment, communication over the network is enabled by wired and/or wireless connections and combinations thereof. In an embodiment, the network includes the Internet and/or other publicly-addressable communications network, although for other networks an alternative device serving a similar purpose could be used as would be apparent to one of ordinary skill in the art.

There can be several computer systems, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The computer system can include any appropriate hardware, software and firmware for integrating with the data store as needed to execute aspects of one or more applications for the client device, handling some or all of the data access and business logic for an application.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing an operating system 1112 which is used to provide the signed executable features described in the present document.

The data store 1110, in an embodiment, is operable, through logic associated therewith, to receive instructions from the computer system 1108 and obtain, update or otherwise process data in response thereto and the computer system 1108 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the computer system. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In an example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and Bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). For example, an encryption operation is one-way to entities that do not have the decryption key.

Information may be said to be programmatically unexportable if there is no legitimate way to programmatically cause (e.g., through an interface of the device) the device to provide the information). The information may be maintained, for example, such that there is no request mechanism (e.g., application programming interface (API) call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form.

Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, at a host computer system, a request to apply a signed patch to a piece of signed executable code;
   at the host computer system, as a result of determining that applying the signed patch to the piece of signed executable code is permitted in accordance with a set of patch policies, causing the signed patch to be applied to the piece of signed executable code to produce a patched piece of executable code;
   generating a first digital signature for the patched piece of executable code using a private cryptographic key, the request submitted by a requesting entity that is not able to use the private cryptographic key; and generating a signed patched piece of executable code that includes the patched piece of executable code and the first digital signature, the signed patched piece of executable code provided to the requesting entity.

2. The computer-implemented method of claim 1, further comprising:

generating a first indication of authenticity for the signed patched piece of executable code;

wherein the first indication of authenticity is associated with the private cryptographic key; and the first indication of authenticity is included in the signed patched piece of executable code.

3. The computer-implemented method of claim 2, further comprising:

validating a second digital signature on the signed piece of executable code using a first public key of a code author, the first public key provided in a second indication of authenticity provided with the signed piece of executable code;

verifying an identity of the code author using the second indication of authenticity;

validating a third digital signature on the signed patch using a second public key of a patch author, the second public key provided in a third indication of authenticity provided with the signed patch; and verifying an identity of the patch author using a third indication of authenticity provided with the signed patch.

4. A system, comprising:

one or more processors;

memory that stores computer-executable instructions that, if executed, cause the system to:

obtain, from a user of the system, a request to apply a patch to a piece of signed executable code;

evaluate a set of patch policies to determine that the patch is allowed to be applied to the piece of signed executable code;

apply the patch to the piece of signed executable code to produce modified executable code;

apply a digital signature to the modified executable code, the digital signature created using a private key of a public-private key pair, the private key not accessible by the user;

store a piece of signed modified executable code that includes the digital signature;

cryptographically verify that the digital signature is valid using a public key of the public-private key pair; and execute the piece of signed modified executable code on the one or more processors.

5. The system of claim 4, wherein:

the piece of signed modified executable code includes a digital certificate;

the digital certificate includes authorship information extracted from the piece of signed executable code; and the digital certificate includes authorship information extracted from the patch.

6. The system of claim 5, wherein:

the authorship information extracted from the piece of signed executable code is stored in a first extension to the digital certificate; and the authorship information extracted from the patch is stored in a second extension to the digital certificate.

7. The system of claim 4, wherein:

the patch includes a digital signature of the patch; and the patch is validated by verifying the digital signature of the patch.

8. The system of claim 4, wherein:

the piece of signed executable code has an identifiable author; and the set of patch policies identifies a set of patch authors that are allowed to produce patches that can be applied to the piece of signed executable code.

9. The system of claim 4, wherein:

the computer-executable instructions further cause the system to generate a digital certificate for the modified executable code, the digital certificate including a public key of the public-private key pair, and the digital certificate signed using a private key of a certificate authority trusted by the system; and the piece of signed modified executable code includes the digital certificate.

10. The system of claim 4, wherein the set of patch policies includes a policy that determines that the patch is allowed to be applied based on a characteristic of the user.

11. A non-transitory computer-readable storage medium storing executable instructions that, as a result of being executed by one or more processors of a computer system, cause the computer system to at least:

obtain a request to apply a patch to a piece of signed executable code;

apply the patch to the piece of signed executable code to produce modified executable code;

determine that the modified executable code is allowed to be signed based on a patch policy;

generate, using a private key of a public-private key pair that is available to the computer system, a digital signature for the modified executable code;

provide signed modified executable code corresponding to the modified executable code, the signed modified executable code including the digital signature;

validate a digital certificate provided with the piece of signed executable code; and verify a digital signature on the piece of signed executable code using a public cryptographic key included with the digital certificate.

12. The non-transitory computer-readable storage medium of claim 11, wherein the executable instructions further comprise instructions that, as a result of being executed by the one or more processors, cause the computer system to:

validate a digital certificate provided with the patch; and verify a digital signature on the patch using a public cryptographic key included with the digital certificate.

13. The non-transitory computer-readable storage medium of claim 11, wherein the executable instructions further comprise instructions that, as a result of being executed by the one or more processors, cause the computer system to:

identify a provider of the piece of signed executable code;

identify, using the patch policy, a set of public cryptographic keys based on the identified provider; and as a result of determining that the patch is signed with a key in the set of public cryptographic keys, allow the signed modified executable code to be provided.

14. The non-transitory computer-readable storage medium of claim 11, wherein the executable instructions further comprise instructions that, as a result of being executed by the one or more processors, cause the computer system to:

identify, using the patch policy, a set of public cryptographic keys based on the piece of signed executable code; and as a result of determining that the patch is signed with a key in the set of public cryptographic keys, allow the signed modified executable code to be provided.

15. The non-transitory computer-readable storage medium of claim 11, wherein:

the signed modified executable code includes information that identifies a provenance of the signed modified executable code; and the provenance identifies the piece of signed executable code and the patch.

16. The non-transitory computer-readable storage medium of claim 11, wherein:

the signed modified executable code includes a digital certificate issued by a local certificate authority operated by the computer system;

the local certificate authority is represented in a trust store maintained by the computer system; and the trust store is a data store that identifies one or more certificate authorities capable of issuing trusted digital certificates.

17. The non-transitory computer-readable storage medium of claim 11, wherein the executable instructions further comprise instructions that, as a result of being executed by the one or more processors, cause the computer system to:

identify a code provider of the piece of signed executable code;

identify a patch provider of the patch; and wherein the patch provider is different than the code provider.

* * * * *